US012782316B2

(12) United States Patent
Pandey et al.

(10) Patent No.: US 12,782,316 B2
(45) Date of Patent: Nov. 3, 2026

(54) pH SENSOR WITH SECONDARY REFERENCE ELECTRODE

(71) Applicant: Rosemount Inc., Shakopee, MN (US)

(72) Inventors: Charu L Pandey, Shakopee, MN (US); Tyrel L. Ruch, Saint Paul, MN (US); Kevin J Ivanca, Minneapolis, MN (US); Steven J. Mccoy, Eden Prairie, MN (US)

(73) Assignee: Rosemount Inc., Shakopee, MN (US)

( * ) Notice: Subject to any disclaimer, the term of this patent is extended or adjusted under 35 U.S.C. 154(b) by 378 days.

(21) Appl. No.: 17/709,754

(22) Filed: Mar. 31, 2022

(65) Prior Publication Data

US 2023/0314368 A1 Oct. 5, 2023

(51) Int. Cl.
*G01N 27/416* (2006.01)
*G01K 7/16* (2006.01)
*G01N 27/30* (2006.01)

(52) U.S. Cl.
CPC ....... *G01N 27/4167* (2013.01); *G01N 27/301* (2013.01); *G01K 7/16* (2013.01)

(58) Field of Classification Search
CPC ............. G01N 27/4167; G01N 27/301; G01N 27/401; G01N 27/302; G01N 27/36; G01K 7/16; G01K 13/026
See application file for complete search history.

(56) References Cited

U.S. PATENT DOCUMENTS

| | | | | |
|---|---|---|---|---|
| 2002/0029964 | A1* | 3/2002 | Matsumoto | C12Q 1/002 204/403.1 |
| 2019/0120786 | A1* | 4/2019 | Vettermann | G01N 27/301 |
| 2020/0072782 | A1* | 3/2020 | Hahn | A61B 5/14532 |
| 2022/0050077 | A1* | 2/2022 | Murayama | G01N 27/4167 |
| 2022/0128506 | A1* | 4/2022 | Feng | G01N 27/416 |

FOREIGN PATENT DOCUMENTS

| | | | |
|---|---|---|---|
| CN | 109709190 | A | 5/2019 |
| CN | 112771373 | A | 5/2021 |
| CN | 220305214 | U | 1/2024 |

(Continued)

OTHER PUBLICATIONS

Thermo Scientific Orion Star A210 Series, Jun. 2015, ThermoFisher (Year: 2105).*

(Continued)

*Primary Examiner* — Shizhi Qian
*Assistant Examiner* — Randall Lee Gamble, Jr.
(74) *Attorney, Agent, or Firm* — Christopher R. Christenson; Kelly, Holt & Christenson, P.L.L.C.

(57) ABSTRACT

A pH sensing probe configured to be exposed to a process fluid is provided. The pH sensing probe includes a sensor body and a pH electrode mounted to the sensor body. A primary reference electrode is mounted to the sensor body and has a primary reference junction that is configured to be exposed to the process fluid. A secondary reference electrode is mounted to the sensor body and has a secondary reference junction configured to be exposed to the process fluid. A seal isolates the secondary reference junction from the process fluid until deterioration of the primary reference junction. A pH sensing system and a method of operating a pH sensing system are also provided.

9 Claims, 10 Drawing Sheets

(56) References Cited

FOREIGN PATENT DOCUMENTS

| | | | | | |
|---|---|---|---|---|---|
| CN | 110487861 | B | | 4/2024 | |
| EP | 3795988 | A1 | * | 3/2021 | ........... G01N 27/301 |
| JP | 2001141692 | A | | 5/2001 | |
| JP | 2004117280 | A | | 4/2004 | |
| JP | 2013190430 | A | | 9/2013 | |
| JP | 2021515217 | A | | 6/2021 | |

OTHER PUBLICATIONS pH and Reference Electrode User Manual, 2020, Unisense A/S (Year: 2020).*

E-switch. Rotary Switches, 2021. (Year: 2021).*

International Search Report and Written Opinion for PCT Patent App# PCT/US2023/064213, Dated Jun. 27, 2023, 13 pages.

Notification of Reasons For Rejection for Japanese Application No. 2024-557558, mailed Oct. 7, 2025, 13 Pages.

Notification of Reasons for Rejection for Japanese Application No. 2024-557558, mailed May 12, 2026, 16 Pages.

Extended European Search Report for European Application No. 23781958.6, mailed Feb. 11, 2026, 7 Pages.

First Office Action for Chinese Application No. 202310334418.5, mailed Dec. 5, 2025, 26 pages.

Office Action for Indian Application No. IN202427074341 mailed Jul. 28, 2026, 8 Pages.

Second Office Action for Chinese Application No. 202310334418.5 mailed Jun. 19, 2026, 26 Pages.

Decision of Rejection for Chinese Application No. 202310334418.5, dated Jul. 31, 2026, 14 pages.

* cited by examiner pH SENSOR WITH SECONDARY REFERENCE ELECTRODE

BACKGROUND pH is defined as the negative logarithm of the concentration of hydrogen ions. pH is on a scale of 0-14 and pH values less than 7 confirm acidic conditions in the process, while pH values greater than 7 confirm basic conditions. Typical strong acids such as hydrochloric acid (stomach acid) and battery acid (sulfuric acid) have pH values less than 1 and are very corrosive. Similarly, strong bases such as caustic or bleach and drain cleaners have pH values greater than 13 and are also very corrosive. The pH value of pure water is 7.

Commercially available pH sensors are used in a wide range of applications. One application is the neutralization of drinking water to city pH limits. Here, pH is essential for the safety and health of the community. pH control is employed in caustic scrubbers to determine the amount of caustic that has reacted with noxious gases, and therefore how much caustic to replenish. pH sensors are also used in the control and monitoring of industrial processes. For instance, it has been shown that the optimum pH for penicillin production in bioreactors is between 6.8 and 7.8. Thus, for safety and efficiency reasons, the accuracy of pH measurements is crucial in many processes.

SUMMARY

A pH sensing probe configured to be exposed to a process fluid is provided. The pH sensing probe includes a sensor body and a pH electrode mounted to the sensor body. A primary reference electrode is mounted to the sensor body and has a primary reference junction that is configured to be exposed to the process fluid. A secondary reference electrode is mounted to the sensor body and has a secondary reference junction configured to be exposed to the process fluid. A seal isolates the secondary reference junction from the process fluid until deterioration of the primary reference junction. A pH sensing system and a method of operating a pH sensing system are also provided.

DETAILED DESCRIPTION OF ILLUSTRATIVE EMBODIMENTS

Many current pH sensors generally contain a single reference electrode which is used to complete the circuit for a pH measurement. This "reference" should remain stable for accurate pH measurements. Processes can attack the reference causing the sensor to drift out of calibration. Sensors may be recalibrated to correct for this drift or offset until the offset is too large (generally +/−60 mV, for example). Outside of this range, the reference has been contaminated or poisoned and should be replaced. In accordance with various embodiments set forth below, a secondary reference electrode or backup reference electrode is provided in a pH sensor or pH sensing system that is sealed from the process until it is needed. Upon failure or deterioration of the primary reference, the secondary reference is exposed to the process. As used herein, "deterioration" of a reference electrode includes breakage, plugging, poisoning or other conditions that reduce the ability of the reference electrode to provide a suitable reference. Secondary reference electrode acts as a backup while a new sensor is being ordered or used to increase sensor life in applications where the reference electrode is known to be the cause of sensor failure.

Figure 1:
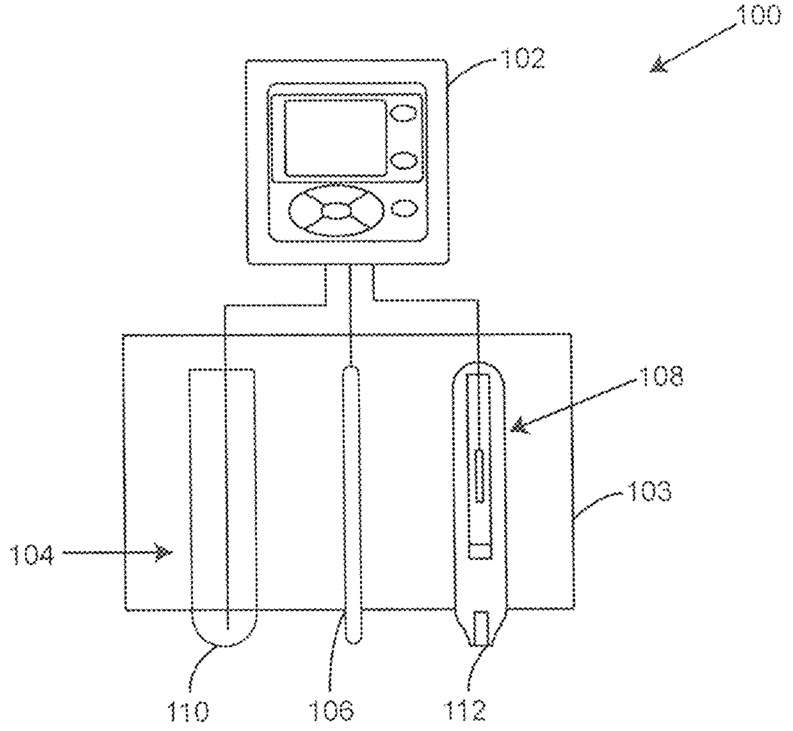
FIG. 1 is a diagrammatic view of a known pH measurement system.

FIG. 1 is a diagrammatic view of a known pH measurement system. Loop 100 includes a transmitter 102 operably coupled to pH sensor 103 having glass electrode 104, temperature element 106, and reference electrode 108. Glass electrode 104, temperature element 106, and reference electrode 108 are generally provided in a single pH sensor probe housing that is disposed to interact with a process fluid. Thus, pH glass bulb 110 is configured to be immersed or contacted by the process fluid while temperature element 106 is configured to provide an electrical indication of the temperature of the process fluid. Typically, temperature element 106 is a resistance temperature device (RTD). Note, while a single wire is shown coupling temperature element 106 to transmitter 102, those skilled in the art will recognize that the single connection represents any suitable number of physical conductors to operably couple a temperature sensor to the transmitter. For example, if temperature element 106 is a four-wire RTD, then the single line represents four different conductors. Reference electrode 108 generally includes a reference junction 112, which electrically couples pH electrode 104 to reference electrode 108.

Transmitter 102 detects or otherwise measures the electrical signals from pH glass electrode 104, temperature element 106, and reference electrode 108 and provides an indication of pH of the process fluid. As shown, loop 100 consists of transmitter 102, glass electrode 104, reference electrode 108, and RTD 106 for temperature compensation. The sensing technology is at the end of glass electrode 104 and is called the pH glass bulb 110. Here, hydrogen ions in the process are absorbed into the leeched layer of the pH glass. Because the inside of the glass electrode 104 is filled with pH 7 buffer, the difference in the concentration of hydrogen ions across the pH glass (between the buffer solution inside the glass electrode 104, and the hydrogen ions in the process) generates a millivolt (mV) potential. This millivolt potential drives the flow of electrons in the pH loop and can be modeled by the Nernst Equation set forth below.

$$\text{Nernst Equation: } E = E^{o} - \frac{RT}{zF}\ln Q$$

E is the reduction potential, E° is the standard potential, R is the universal gas constant, T is the process temperature in degrees Kelvin, z is the ion charge (moles of electrons), F is the Faraday constant, and Q is the reaction quotient.

One example of a known pH sensor employing a pH glass electrode is sold under the trade designation Model 3300HT PERph-X High Performance pH/ORP Sensor available from Rosemount Inc., an Emerson Company. Additionally, a commercially-available example of transmitter 102 is sold under the trade designation Model 56 Dual Input Analyzer available from Rosemount Inc.

Figure 2:
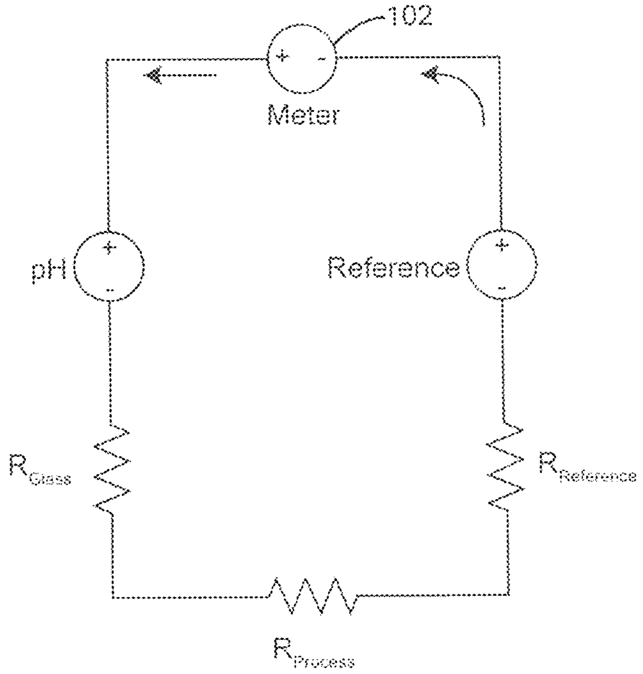
FIG. 2 is an electrical circuit diagram of a pH electrode.

FIG. 2 is an electrical circuit diagram of a pH electrode. In the illustrated circuit, the pH voltage varies with changes in process fluid pH, and the reference voltage remains constant with different process fluids. The reference electrode (such as electrode 108) in the pH loop is open to the process and provides a path for electrons to flow back to the transmitter. FIG. 2 shows the flow of electrons in the path. Generally, the flow is from the transmitter or meter 102 down the Ag/AgCl wire of the glass electrode, through the buffer solution inside the glass electrode, out the pH glass, into the process, up into the reference junction, through the reference electrode, up the Ag/AgCl wire of the reference electrode, and back to the transmitter. FIG. 2 illustrates an electrical schematic of the pH loop. The voltage read by transmitter 102 is the sum of the voltages across pH glass, reference junction, and reference electrode. The reference electrolyte is typically a mixture of potassium chloride. The reference electrode potential is theoretically calculated as the potential between the Ag/AgCl wire and the chlorine ion in the reference electrolyte.

pH sensors can fail in several ways. First, the pH glass can age with temperature or attack from the process chemicals such as sodium hydroxide. Second, the pH glass can crack due to operator handling or impingement of undissolved solids. Third, the reference electrode can be poisoned by ions such as cyanide and sulfide to form precipitates that plug the reference junction. Fourth, the reference potential can be poisoned by diffusion of ions from the solution through the reference junction. The reference potential is determined by the potential difference between the Ag/AgCl wire and the chloride ions surrounding the wire in the reference electrolyte. Process ions can diffuse through the reference junction and displace the chloride ions, as the latter diffuse out of the reference junction. For pH sensors whose reference electrode is poisoned, the reference voltage will change. This will cause an error in the reported pH value. Fifth, the reference electrode can deplete over time through diffusion out the reference junction. This is what normally occurs in high purity water applications. The concentration of ions is higher in the reference electrode than in the process, and ions diffuse out the reference junction.

The output of pH sensors can shift over time and process conditions. Accordingly, pH sensors often require frequent calibrations to compensate for these shifts. Changes in the calibration results (slope and offset) indicate the health of the sensor. Offset changes are most often attributed to deterioration of the reference system, while slope changes in the calibration are an indication of pH sensing element deterioration. Additional diagnostics include glass impedance measurements to determine if the glass pH electrode is cracked or broken. Reference impedance measurements determine if the reference system is plugged resulting in noisy pH measurements.

Figure 3:
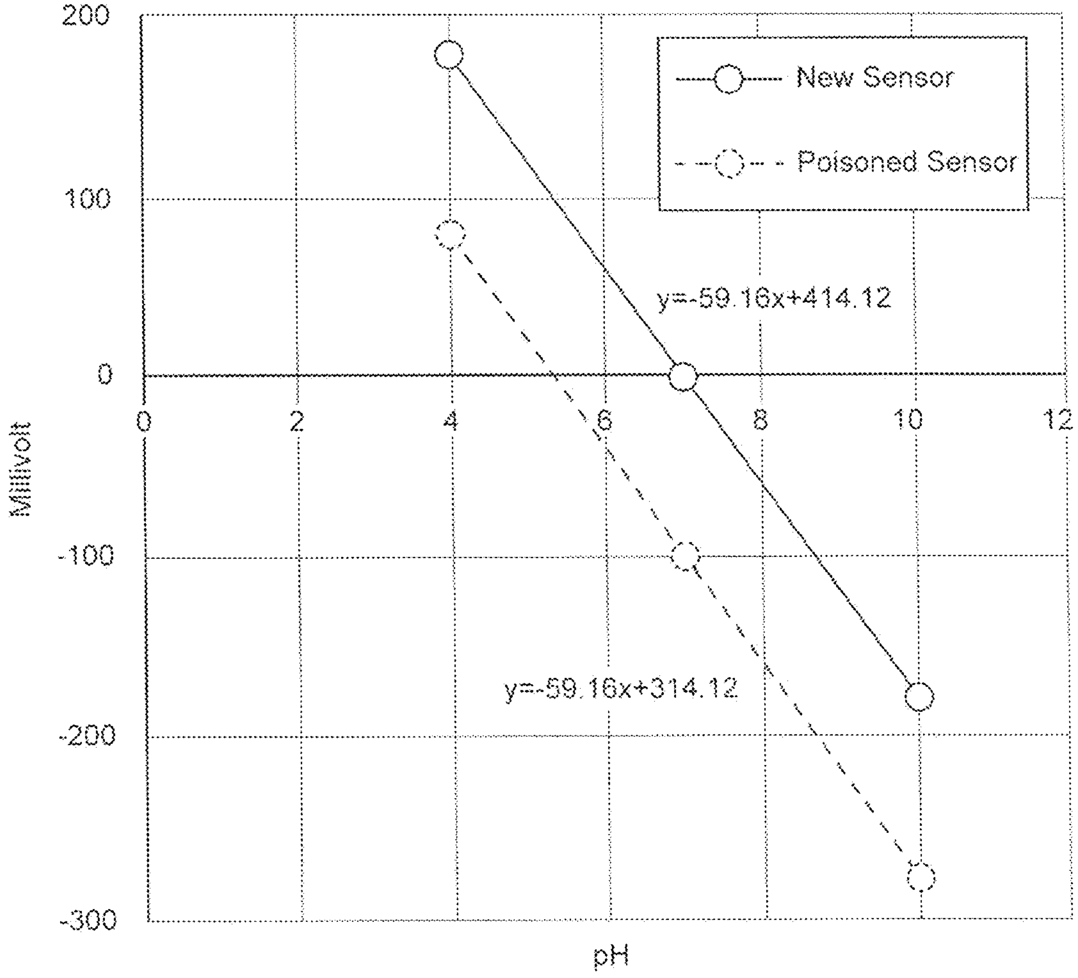
FIG. 3 is a chart of pH vs voltage illustrating a difference between a new pH sensor and a poisoned pH sensor.

FIG. 3 is a chart of pH vs. voltage illustrating a difference between a new pH sensor and a poisoned pH sensor. pH sensor calibration is generally a two-step process, in which a user places the probe in two separate buffers, such as pH 4 and pH 7 buffers. The transmitter then measures the mV signal from the pH sensor while it is placed in one of the two buffers and calculates a slope and offset. At 25° Celsius, the millivolt value in a pH 4 buffer is approximately 180 mV, and the millivolt value in a pH 7 buffer is 0.00 mV. These two points are used by the transmitter to calculate a calibration line. As displayed in FIG. 3, the poisoning of the reference electrode will result in a shift of the calibration line about the y-axis from the ideal calibration line exhibited by new sensors. Some transmitters have a reference offset fail criteria of +/−60 mV as a factory default. When the reference offset changes by more than this default offset fail criteria, an offset error occurs on the transmitter display. The transmitter allows the user to increase the offset range on the transmitter, thereby providing enough time for a replacement to be procured. However, in many instances, a replacement sensor may not be available onsite, and lead times for obtaining a new pH sensor can be long. Furthermore, some users may not be comfortable with increasing the offset range on the reference offset simply for the calibration to pass, as this will lead to error in the pH measurement. In addition to the offset diagnostic after calibration, many transmitters also offer a reference impedance diagnostic to detect a plugged reference. The diagnostic may be performed periodically, on-demand, or even continuously.

Figure 4:
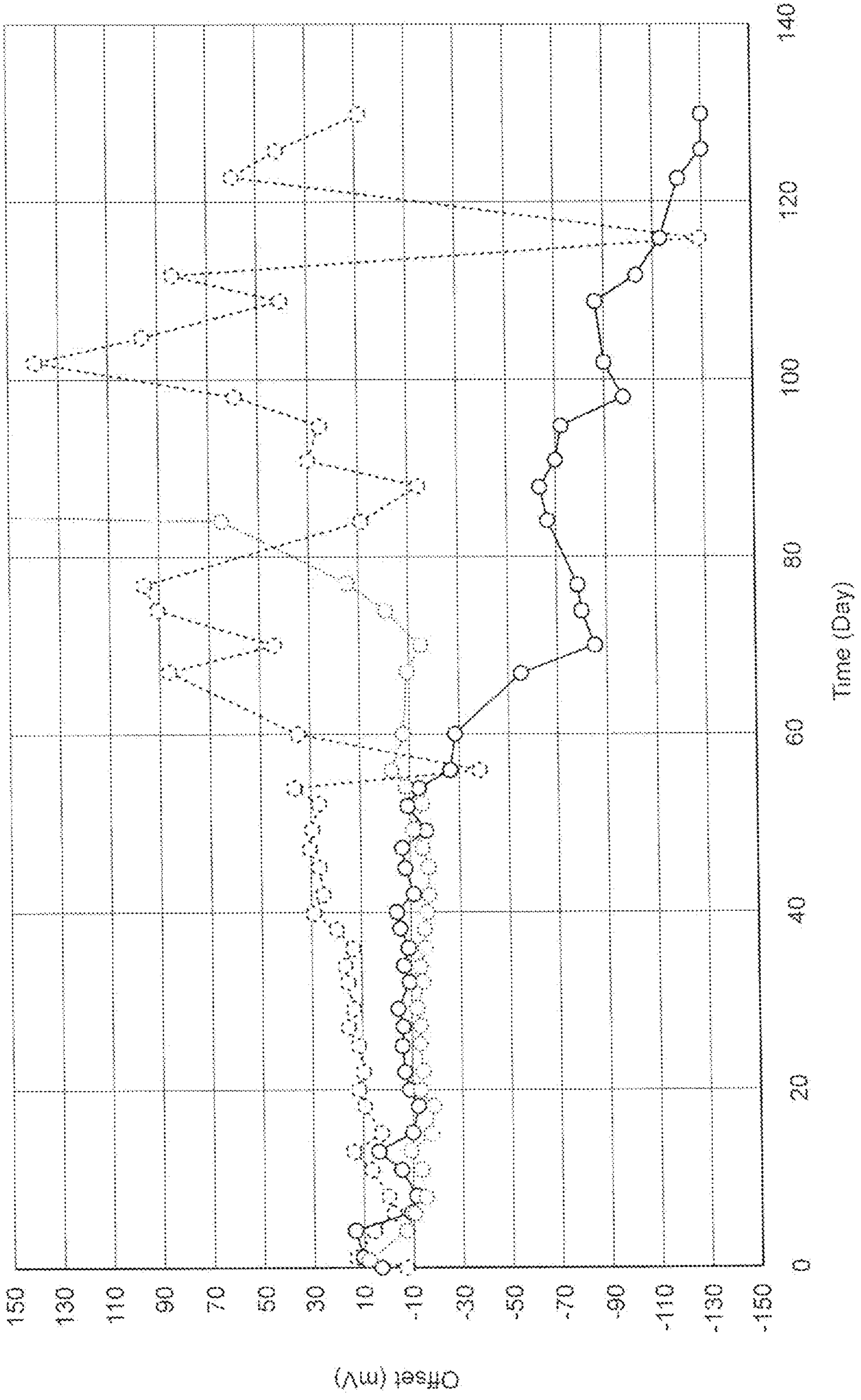
FIG. 4 is a chart showing change in reference offset over time for a pH sensor.

FIG. 4 is a chart showing change in reference offset over time for a pH sensor. The chart illustrated in FIG. 4 illustrates the reference offset obtained by calibration over time for three different pH sensors in an aqueous solution of 0.5 M sodium sulfide at 50° Celsius. Sulfides are poisoning ions and they will react with silver around the wire to form silver sulfide precipitate that can plug the reference junction. The test in FIG. 4 was performed over approximately four months in a lab. It can be seen that the reference offset changes drastically on all three sensors at around 60 days. By 100 days, the reference electrode of all sensors is poisoned for the reference offset exceeds +/−60 mV from the original.

Figures 5A, 5B, 5C:
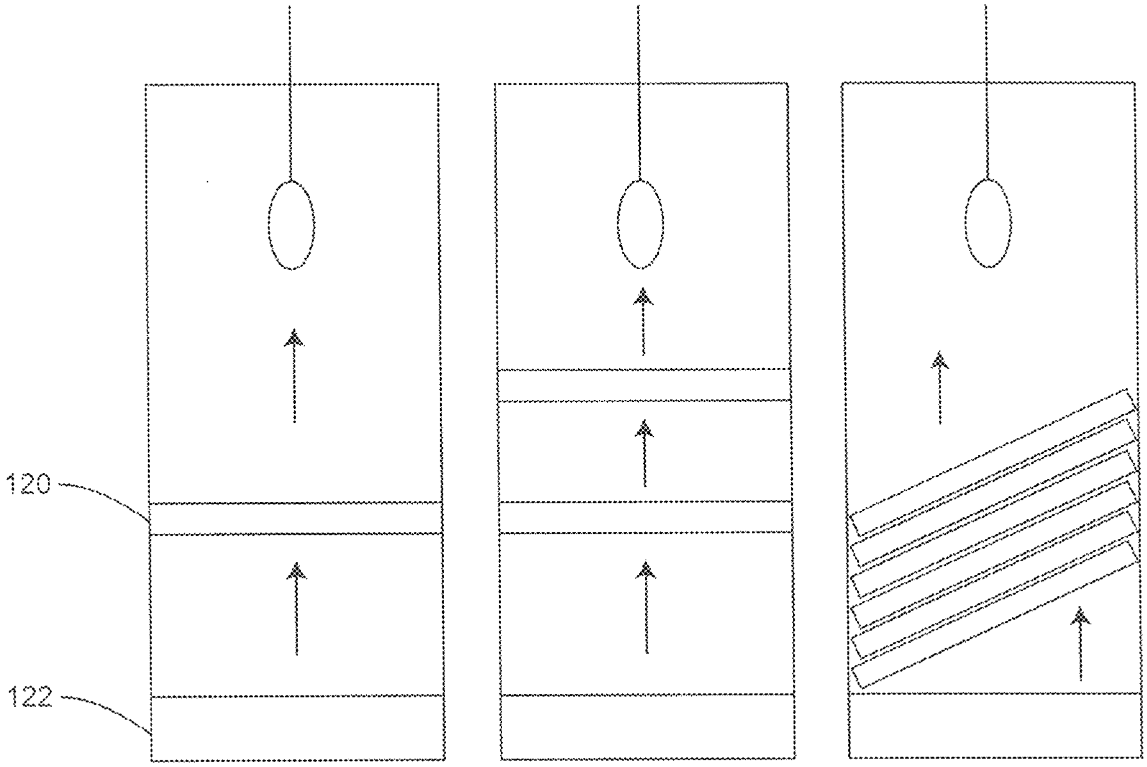
FIGS. 5*a*-5*c* are a diagrammatic views of a number of different types of reference junctions that can be employed in accordance with various embodiments of the present invention to improve the stability of the reference voltage over time for different applications.

FIGS. 5*a*-5*c* are diagrammatic views of a number of different types of reference junctions that can be employed in accordance with various embodiments in the present invention. As shown and described above, the reference electrode is typically open to the process via the reference junction. Therefore, the reference electrode is subject to contamination over time. Chemical processes may contaminate the reference electrode in several ways. Ion diffusion from the process into the reference electrolyte is one way that the reference electrode may be contaminated. When the ions are on the Ag/AgCl wire from the chloride to other kinds of ions, the reference potential is altered and can skew the pH readings. In more extreme cases, ions like cyanide and sulfide can react with the reference electrode and form a precipitate. The precipitate can actually plug the reference junction and cause erratic and erroneous pH readings. While some analytical transmitters, such as transmitter 102 may offer a reference impedance diagnostic, which can account for either plugging of the reference junction by precipitate or dried out reference electrolyte, it is generally preferred to attempt to inhibit such plugging all together.

As set forth above, the reference electrolyte is open to the process, so poisoning of the reference electrode will occur over time. However, to delay poisoning, a variety of reference junction configurations may be employed. The most basic reference junction configuration is a double junction reference illustrated in FIG. 5*a*. In such a double junction reference, each junction 120, 122 is made of polytetrafluoroethylene. pH sensors employing such a double junction reference may be used in drinking water plants and other relatively clean applications. In less clean applications, further adaptations may be useful. FIGS. 5*b* and 5*c* illustrate triple junction reference, and helical reference junctions, respectively. Such junctions are useful for dirtier, tougher applications, such as scrubbers and wastewater treatment facilities. Process ions must jump through three reference junctions in such cases before attacking the reference electrode. There are many types of reference systems that can be used in accordance with embodiments described herein. Examples of materials that may form the reference junctions shown in FIGS. 5*a*-5*c* include, without limitation, polytetrafluoroethylene, wood, ceramic, and capillary. Further, refillable reference systems can also be used in accordance with embodiments described herein.

Figure 6A:
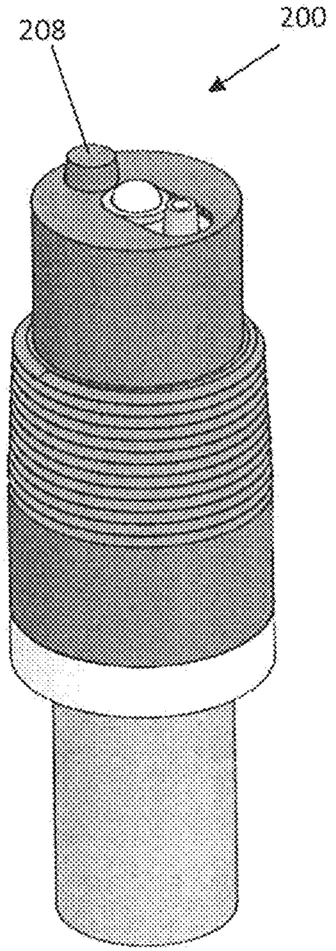
FIGS. 6*a* and 6*b* are diagrammatic perspective and cross-sectional views, respectively, of a pH sensor having a secondary reference electrode in accordance with an embodiment of the present invention.
Figure 6B:
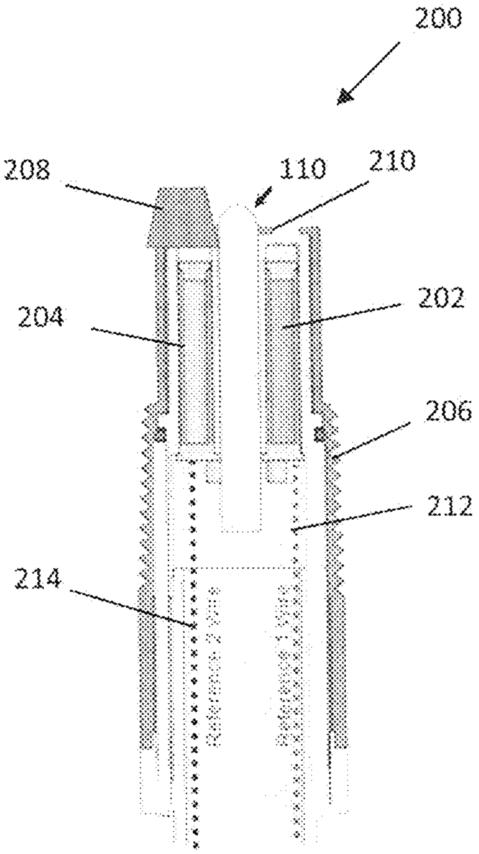

FIGS. 6*a* and 6*b* are diagrammatic views of a pH sensor having a secondary reference electrode in accordance with embodiments of the present invention. Some commercially-available pH sensors provide a full concentric cylinder around the pH glass electrode for the reference electrolyte of the reference electrode. The reference wire and the reference electrolyte are located within this concentric cylinder inside the sensor. In accordance with at least one embodiment described herein, each of the primary reference electrode and the secondary reference electrode includes its own reference wire and reference electrolyte in its own half of a concentric cylinder around the pH glass electrode. While one particular embodiment is shown in FIGS. 6*a* and 6*b*, those skilled in the art will recognize that changes can be made in shape and size in accordance with the various embodiment described herein. Regardless of the configuration of the second reference electrode, it is preferred that the primary and secondary reference electrodes are isolated from one another. Thus, a full concentric cylinder around the pH glass electrode is divided into two separate half cylinders, each of which support a different reference electrode. Each reference electrode will be provided with the same number and type of reference junctions and reference electrolytes.

As can be seen, each of reference electrodes 202, 204 is disposed proximate pH glass bulb 110. However, one of the reference electrodes is, at least initially, isolated from the process. As shown in FIGS. 6*a* and 6*b*, this is accomplished by providing a molded plastic cover 208 over reference electrode 204 in order to isolate reference electrode 204 from the process. As can be seen, reference electrode 202 is open to the process by virtue of aperture 210 in sensor body 206. When the primary reference electrode 202 is determined to have been poisoned or otherwise unacceptably compromised, plastic cover 208 is twisted off or otherwise removed and/or displaced. Immediately, an electrical switch between the primary to secondary electrode is done. This can be accomplished by manually changing the wiring from conductor 212, which was coupled to a transmitter or other suitable sensing circuitry prior to reference electrode 202 becoming poisoned and coupling new conductor 214 to the transmitter thereby electrically coupling reference electrode 204 to the transmitter. Alternatively, this switchover may occur automatically by providing both conductors 212, 214 to a switching circuit that may be controlled by a suitable processor. Accordingly, when the processor of the transmitter determines that reference electrode 202 has been poisoned or otherwise has deteriorated or aged beyond an acceptable level, the transmitter can automatically engage reference electrode 204 and also provide a notification to a responsible party that the pH sensor 200 should be replaced. After the electrical switchover is done, either manually, or automatically, a recalibration of the pH sensor should be performed.

Figure 7A:
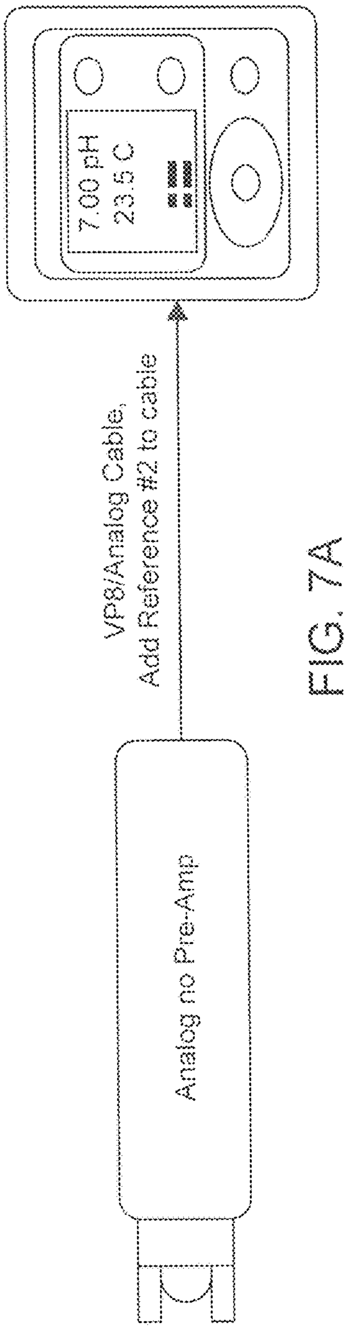
FIG. 7*a*-7*c* are diagrammatic views illustrating a number of different ways that a secondary reference electrode may be engaged in accordance with embodiments of the present invention.
Figure 7B:
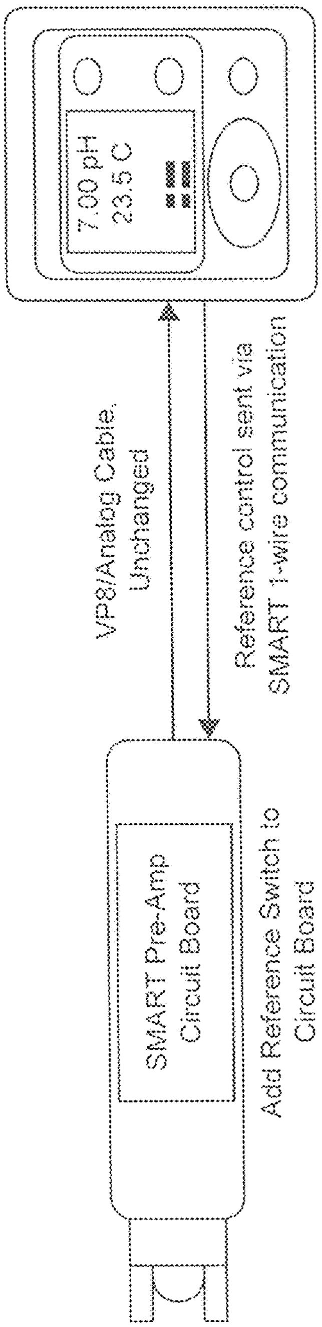
Figure 7C:
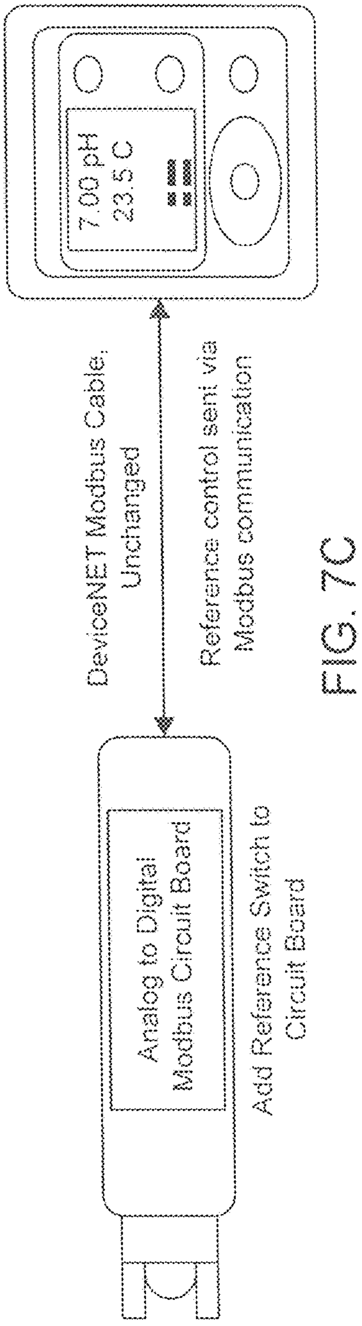

FIGS. 7*a*-7*c* are diagrammatic views illustrating a number of different ways that a secondary reference electrode may be engaged in accordance with embodiments of the present invention. Modern pH sensors typically have analog connection systems (analog connectors and cables) that are wired directly to transmitters or integrated electronics (preamplifiers or digital electronics). Adding a secondary reference system may require new electronics to manage the new signal. In one embodiment, this is accomplished using an analog system or a digital system with the creation of new hardware, such as a switch that receives both signals and provides a selected one of the signals to a digital or analog sensing system based upon a control signal received from a processor, such as a microprocessor. With the secondary reference sealed from the process, the secondary reference will have a high resistance from the process. This signal can be used to determine if the reference is to be used. The electronics of the transmitter, or even a probe system, could report pH based on the primary reference and/or pH based on the secondary reference. If the primary reference has failed, removing the seal will provide additional sensor useful life. The electrical circuitry would require another measurement to assess the secondary reference voltage.

As shown in FIGS. 7*a*-7*c*, a variety of options are possible. One option, shown at FIG. 7*a*, is an analog signal being provided with no preamplifier directly to a transmitter via a suitable cable, such as a VP8/analog cable where a conductor for the secondary reference is simply added to the cable. When the secondary reference electrode is to be used, the wire in the cable that connects to the secondary reference is simply coupled to the reference connection of the transmitter. In another embodiment, shown in FIG. 7*b*, the pH sensing system is included with a smart preamplifier circuit board. This smart preamplifier circuit board is provided with a reference switch that receives both conductors 212, 214, and then provides a selected one of the signals to the transmitter based upon a reference control sent via smart 1-wire communication from the transmitter. One benefit of this system is that the electronics of the transmitter need not change from legacy systems, but instead a software update can be provided to the transmitter such that it can generate the necessary reference control signal when the transmitter determines that the primary reference is no longer usable. In yet another embodiment, shown in FIG. 7*c*, an analog-to-digital Modbus circuit board is added to the pH probe system. The analog-to-digital Modbus circuit board includes a reference switch to the circuit board. This circuit board itself determines when the primary reference has deteriorated to an unacceptable extent and automatically switches the reference switch to the secondary reference. The pH sensing probe is generally coupled to the transmitter via a suitable DeviceNET Modbus cable. One advantage of this particular embodiment is that there is no impact to the electronics of the transmitter. In yet another embodiment, the transmitter itself may be provided with a software update such that the transmitter provides the signal to the analog-to-digital Modbus circuit board to cause the reference switch to switch over to the secondary reference electrode. As can be appreciated, a number of options are available for manually and/or automatically switching to the secondary reference when the primary reference is no longer usable.

Figure 8A:
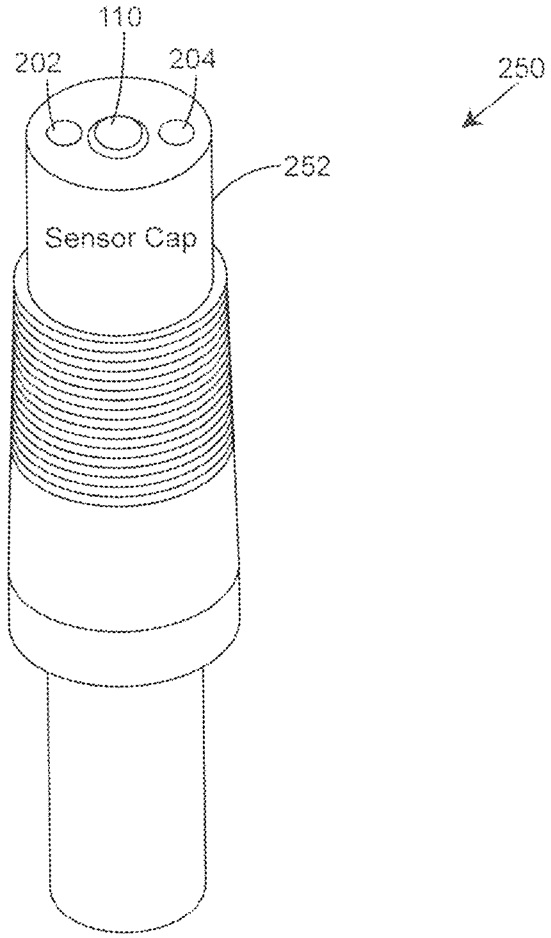
FIGS. 8*a* and 8*b* are diagrammatic views of a portion of a pH sensor in accordance with an embodiment of the present invention.
Figure 8B:
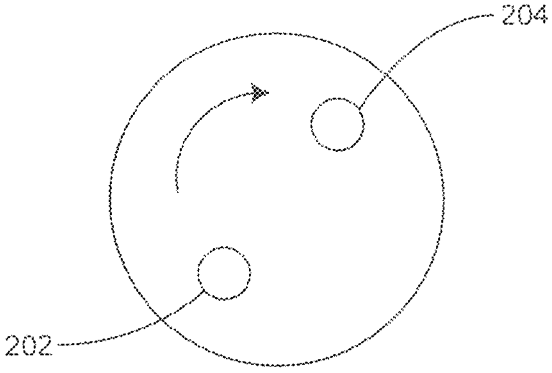

FIGS. 8A and 8B are diagrammatic views of a portion of a pH sensor in accordance with an embodiment of the present invention. While prior embodiments have described the switchover from the first reference electrode to the second reference electrode as occurring by removal of a sensor cover 208 (shown in FIG. 6) and electrically coupling the secondary reference electrode (either manually or automatically) to a transmitter, both the physical coupling of the secondary reference electrode to the process, and the electrical coupling of the secondary reference electrode to the transmitter can occur in other ways.

FIG. 8A illustrates pH sensor 250 having a sensor cover 252 with a glass bulb electrode 110 disposed proximate a center of sensor cover 252. Sensor cover 252 is rotatable (as shown in FIG. 8B) to select between reference 202 and reference 204. In one embodiment, rotation shown in FIG. 8B automatically isolates reference 202 from the process and exposes reference 204 to the process. In yet another embodiment, this rotation will also displace internal electrical components, such as switch contacts, to electrically couple reference 204 to the reference connection of the sensor when sensor cover 252 is rotated to the reference 204 position. While rotation is shown in FIGS. 8A and 8B, this is merely to show additional ways in which the reference electrodes can be switched both physically and electrically. Those skilled in the art will recognize other types of motion and operations that can be employed in accordance with embodiments described herein. Further, while embodiments described herein have generally been with respect to a pair of reference electrodes (reference 202 and reference 204) is expressly contemplated that additional reference electrodes (such as a tertiary or quaternary reference electrode) can be added, as long as suitable physical couplings and electrical connections can be accommodated.

Figure 9:
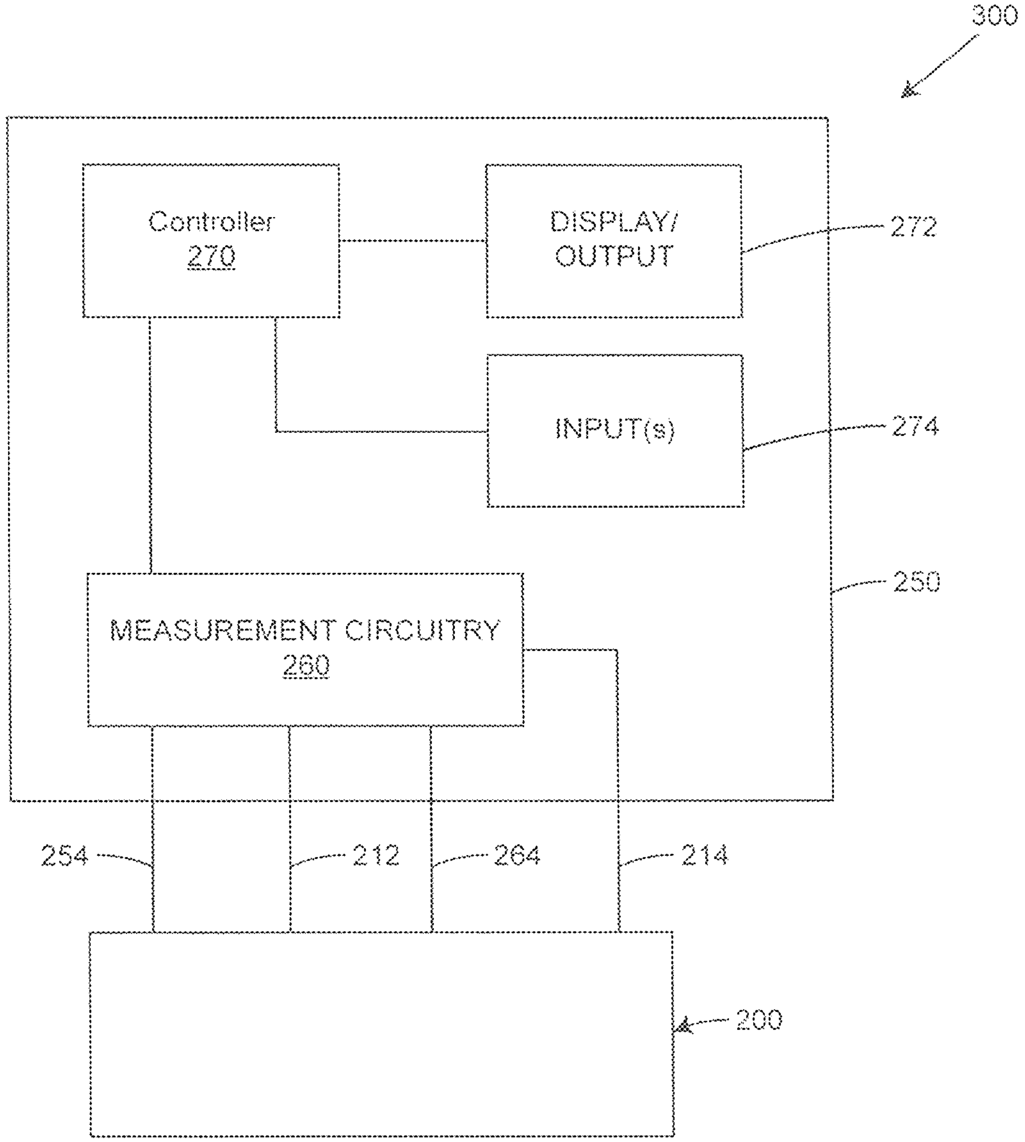
FIG. 9 is a diagrammatic view of a pH transmitter in accordance with an embodiment of the present invention.

FIG. 9 is a diagrammatic view of a pH glass sensor system in accordance with another embodiment of the present invention. As shown, system 300 includes transmitter 250 that is coupled to pH sensor 200 which includes a secondary reference electrode. In the illustrated embodiment, the reference electrodes, pH sensing electrode and temperature sensing device are coupled to measurement circuitry 260 via respective conductors 254, 212, 214, and 264. Measurement circuitry 260 can include any suitable amplification, linearization, analog-to-digital conversion and/or multiplexing circuitry in order to individually interact with the conductors 254, 212, 214, and 264 to measure signals relevant to the sensors. In the example of pH measurement, measurement circuitry 260 is able to detect the millivolt potential across conductor 254 and one of conductors 212, 214. Similarly, measurement circuitry 260 is able to measure process fluid temperature based on the signal (e.g., resistance) of temperature device 106 (shown in FIG. 10) via conductor(s) 264.

Measurement circuitry 260 is operably coupled to controller 270 and provides one or more signals indicative of the various electrical parameters of the pH sensor and/or temperature element to controller 270. Controller 270 may be any suitable combination of hardware or software that is able to execute one or more programmatic steps to obtain indications of the millivolt potentials of the pH sensor, obtain indications of the process fluid temperature, and provide a temperature-compensated pH output based on the millivolt potentials. In one embodiment, controller 270 is a microprocessor. Controller 270 is operably coupled to display/output module 272 as well as one or more inputs 274. Display/output module 272 can include a liquid crystal display, or other suitable type of display as well as one or more indicator lights. Additionally, display/output module 272 can include an audible output such as a local alarm. Further, display/output module 272 can include signaling circuitry able to interact with one or more remote devices, such as via a wireless process communication protocol, such as WirelessHART (IEC 62591). The one or more inputs 274 can include suitable user-actuatable buttons, a keypad, a joystick, a microphone, or other suitable user input device(s) capable of receiving user input.

In one embodiment, controller 270 is configured, through hardware, software, or a combination thereof, to perform a reference electrode test to identify breakage, deterioration, or aging, of the reference electrode and provide a signal indicative of such condition. Further, controller 270 is configured to identify a point in time or occurrence when the reference electrode coupled via conductor 212 can no longer be used, and to automatically transition to providing a temperature-compensated pH output based on the backup reference electrode via its signal via line 214.

Figure 10:
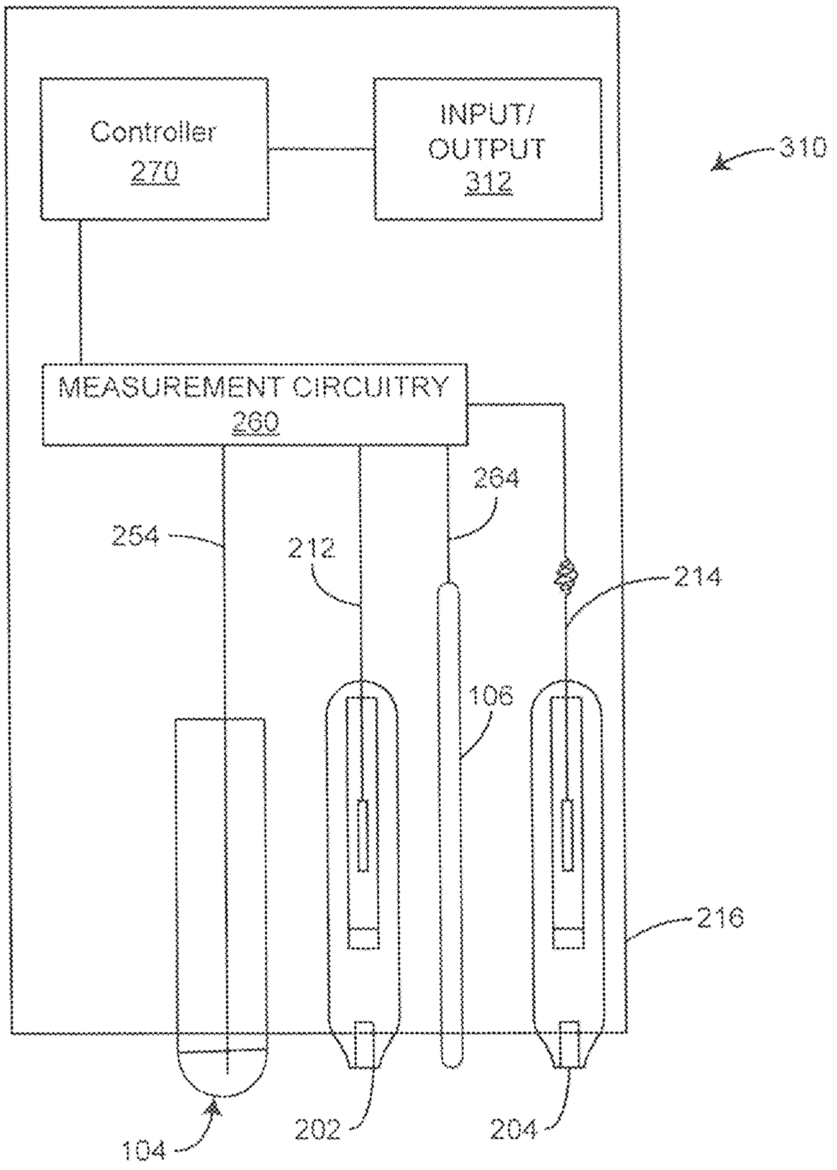
FIG. 10 is a diagrammatic view of a pH sensing system in accordance with another embodiment of the present invention.

FIG. 10 is a diagrammatic view of a pH sensing system in accordance with another embodiment of the present invention. System 310 bears some similarities to system 300 (described with respect to FIG. 6) and like components are numbered similarly. System 300 can be the same as the embodiment shown in FIG. 7*c*. Unlike system 300, system 310 does not require a transmitter such as transmitter 250. Instead, some components of transmitter 250 are instead provided within pH sensor probe housing 216. Thus, measurement circuitry 260 and controller 270 are disposed within housing 216. Additionally, input/output circuitry 312 is disposed within housing 216 and coupled to controller 270 in order to allow controller 270 to communicate, preferably using digital communication, with one or more external devices. In one example, input/output circuitry 312 is configured to communicate in accordance with one or more process industry standard communication protocols, such as the wired Highway Addressable Remote Transducer (HART®) protocol, FOUNDATION™ Fieldbus, or a suitable wireless process communication protocol, such as WirelessHART listed above. As with system 300, controller 270 is configured, through hardware, software, or a combination thereof, to perform a reference electrode diagnostic test to identify breakage, deterioration, or aging, of the reference electrode and provide a signal indicative of such condition. Further, controller 270 is configured to identify a point in time or occurrence when the signal of the reference electrode can no longer be used, and to automatically transition to providing a temperature-compensated pH output based on the backup reference electrode via its signal via line 214.

Figure 11:
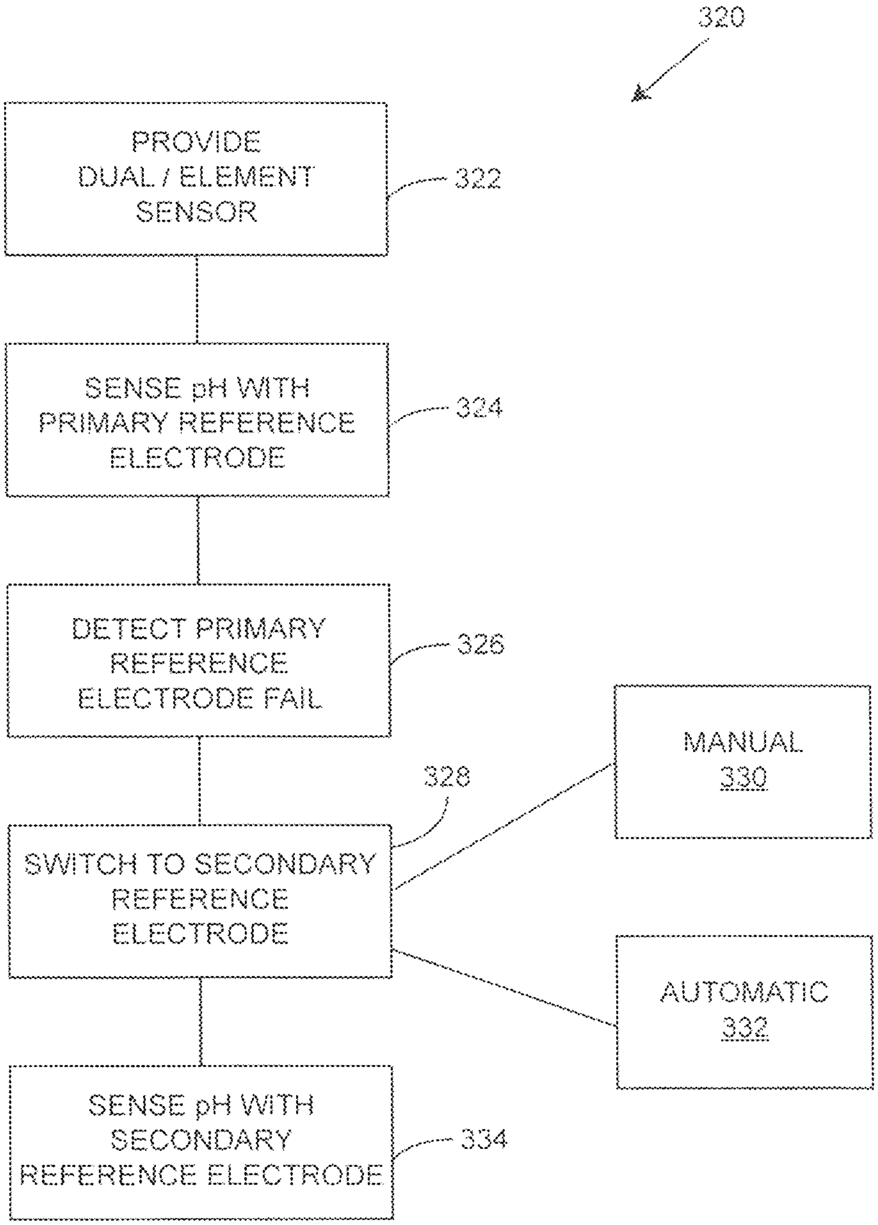
FIG. 11 is a flow diagram of a method of operating a pH sensor having a secondary reference electrode in accordance with an embodiment of the present invention.

FIG. 11 is a flow diagram of a method of operating a pH sensor system in accordance with an embodiment of the present invention. Method 320 begins at block 322 where a dual element pH sensor having a backup reference electrode is provided. In one example, this sensor is sensor 200, described above with respect to FIG. 6. Next, at block 324, the pH sensing loop is used to sense pH with a primary reference electrode, such as electrode 202 (shown in FIG. 6).

At block 326, the controller of the transmitter, such as transmitter 250, detects a degradation/or failure of the primary reference electrode. This detection may be the result of a reference electrode diagnostic process run by the transmitter, or it may be caused indicated by a user. Further, the primary reference electrode failure or deterioration may be detected during normal operation, such as a value that is entirely out of range.

Upon the detection of primary reference electrode degradation/failure, method 320 transitions to block 328 where the pH loop is switched to the secondary reference electrode. This can be a manual process, as indicated at reference number 330, wherein a technician physically disconnects the conductor of the primary reference electrode from the transmitter, and connects a capped, or otherwise unused, conductor of a backup reference electrode to the transmitter. Alternatively, the switch can be automatic, as indicated at reference numeral 332, wherein a controller, such as controller 270 (shown in FIG. 9) automatically switches to determining pH based on a conductor already coupled to the backup reference electrode. In another example, the switching may occur in response to the transmitter receiving a command (e.g. via digital communication employing a process industry standard communication protocol) from an external device (such as a process controller or other suitable device) that causes the transmitter to automatically switch to the secondary or backup reference electrode. Finally, at block 334, the pH is sensed with the secondary reference electrode, and an output is provided, such as on a display of the transmitter. Further, the output can include an indication that the primary pH glass electrode has failed, and that a replacement should be obtained and installed.

Although the present invention has been described with reference to preferred embodiments, workers skilled in the art will recognize that changes may be made in form and detail without departing from the spirit and scope of the invention.

What is claimed is:

1. A pH sensing probe configured to be exposed to a process fluid, the pH sensing probe comprising:
- a cylindrical sensor body;
- a pH electrode mounted centrally to the cylindrical sensor body;
- a primary reference electrode mounted to a first half of the cylindrical sensor body and having a primary reference junction that is configured to be exposed to the process fluid;
- a secondary reference electrode mounted to a second half of the cylindrical sensor body and having a secondary reference junction configured to be exposed to the process fluid;
- a seal isolating the secondary reference junction;
- wherein the seal includes a rotatable sensor cover having a first position in which the primary reference junction is exposed to the process fluid and the secondary reference junction is isolated from the process fluid, and a second position in which the secondary reference junction is exposed to the process fluid; and
- wherein moving the rotatable sensor cover from the first position to the second position displaces internal switch contacts to automatically electrically decouple the primary reference electrode from a sensor reference electrode output conductor and automatically couple the secondary reference electrode to the sensor reference electrode output conductor.

2. The pH sensing probe of claim 1, and further comprising a temperature sensing element configured to provide an indication of process fluid temperature.

3. The pH sensing probe of claim 1, wherein the primary reference electrode comprises a primary reference electrolyte disposed within the first half of the cylindrical sensor body.

4. The pH sensing probe of claim 3, wherein the secondary reference electrode comprises a secondary reference electrolyte disposed within the second half of the cylindrical sensor body, and wherein the primary and secondary reference electrodes are isolated from one another.

5. The pH sensing probe of claim 1, wherein the primary reference junction is selected from the group consisting of a double junction, a triple junction, and a helical junction.

6. The pH sensing probe of claim 1, wherein the secondary reference junction is selected from the group consisting of a double junction, a triple junction, and a helical junction.

7. A pH sensing system comprising:
- a pH transmitter including:
  - a display,
  - at least one user input mechanism,
  - measurement circuitry configured to measure at least one electrical characteristic of an attached device,
  - a controller coupled to the display, the at least one user input mechanism, and the measurement circuitry, the controller being configured to obtain pH information and process fluid temperature information and provide a pH process output;
- a pH sensing probe including:
  - a sensor body;
  - a pH electrode electrically coupled to the measurement circuitry and mounted to the sensor body, the pH electrode being configured to be exposed to a process fluid;
  - a primary reference electrode electrically coupled to the measurement circuitry and having a primary reference junction mounted to the sensor body, the primary reference junction being configured to be exposed to the process fluid;
  - a secondary reference electrode electrically coupled to the measurement circuitry and having a secondary reference junction mounted to the sensor body, the secondary reference junction being configured to be exposed to the process fluid;
  - a seal operably coupled to the secondary reference electrode, the seal being configured to isolate the secondary reference electrode from the process fluid, wherein the seal includes a movable sensor cover having a first position in which the primary reference junction is exposed to the process fluid and the secondary reference junction is isolated from the process fluid, and a second position in which the secondary reference junction is exposed to the process fluid;
  - wherein moving the movable sensor cover from the first position to the second position automatically electrically decouples the primary reference electrode from the measurement circuitry and automatically couples the secondary reference electrode to the measurement circuitry; and
  - wherein the pH sensing probe includes a pre-amplifier circuit board that includes a reference switch operably coupled to the primary reference electrode and the secondary reference electrode, wherein the reference switch is configured to provide a selected signal from one of the primary reference electrode and the secondary reference electrode to the pH transmitter.

8. The pH sensing system of claim 7, wherein the controller includes a microprocessor.

9. A pH sensing probe, comprising:

a sensor body;

measurement circuitry;

a pH electrode electrically coupled to the measurement circuitry and mounted to the sensor body, the pH electrode being configured to be exposed to a process fluid;

a primary reference electrode electrically coupled to the measurement circuitry and having a primary reference junction mounted to the sensor body, the primary reference junction being configured to be exposed to the process fluid;

a secondary reference electrode having a secondary reference junction mounted to the sensor body, the secondary reference junction being configured to be isolated from the process fluid until a seal is unsealed to expose the secondary reference junction to the process fluid;

analog-to-digital circuitry including a reference switch operably coupled to the primary reference electrode and the secondary reference electrode, wherein the analog-to-digital circuitry is configured to determine when the primary reference electrode has degraded and automatically switch to the secondary reference electrode and provide a digital pH signal using a serial communication cable;

wherein the seal includes a movable sensor cover having a first position in which the primary reference junction is exposed to the process fluid and the secondary reference junction is isolated from the process fluid, and a second position in which the secondary reference junction is exposed to the process fluid.

* * * * *